United States Patent
Roth

(10) Patent No.: US 8,217,263 B2
(45) Date of Patent: Jul. 10, 2012

(54) ELECTRICAL SWITCHGEAR CABINET

(75) Inventor: Michael Roth, Sasbach (DE)

(73) Assignee: ABB AG, Mannheim (DE)

( * ) Notice: Subject to any disclaimer, the term of this patent is extended or adjusted under 35 U.S.C. 154(b) by 358 days.

(21) Appl. No.: 12/669,842

(22) PCT Filed: Jul. 21, 2008

(86) PCT No.: PCT/EP2008/005963
§ 371 (c)(1),
(2), (4) Date: Jan. 20, 2010

(87) PCT Pub. No.: WO2009/012962
PCT Pub. Date: Jan. 29, 2009

(65) Prior Publication Data
US 2010/0193214 A1      Aug. 5, 2010

(30) Foreign Application Priority Data
Jul. 24, 2007  (DE) .................. 10 2007 034 513

(51) Int. Cl.
*H05K 5/00* (2006.01)

(52) U.S. Cl. ............. 174/50; 174/58; 439/535; 248/906

(58) Field of Classification Search ............ 174/50, 174/58; 439/535; 220/4.02; 248/906
See application file for complete search history.

(56) References Cited

U.S. PATENT DOCUMENTS

| 4,387,412 A * | 6/1983 | Woods et al. ........... 361/27 |
| 7,947,902 B2 * | 5/2011 | Tang .................... 174/50 |
| 7,964,794 B2 * | 6/2011 | Chung ................... 174/58 |
| 8,093,511 B2 * | 1/2012 | Ljungren ............... 174/491 |

FOREIGN PATENT DOCUMENTS

| EP | 0935324 A1 | 8/1999 |
| EP | 1229620 A1 | 8/2002 |

* cited by examiner

*Primary Examiner* — Dhirubhai R Patel
(74) *Attorney, Agent, or Firm* — Leydig, Voit & Mayer, Ltd.

(57) ABSTRACT

An electrical switchgear cabinet for an electrical service distribution panel includes a rear wall having four corners and four side edges and a peripheral L-shaped first bent edge disposed on each of the four side edges; a first side wall with at least two bent edges; a base wall with at least two bent edges; and a first attachment part disposed at a first corner of the rear wall and insertable behind the first bent edges of two of the four side edges, wherein the first attachment part has two longitudinally running slots, a first slot receiving one of the at least two first side wall bent edges and a second slot receiving one of the at least two base wall bent edges.

22 Claims, 6 Drawing Sheets

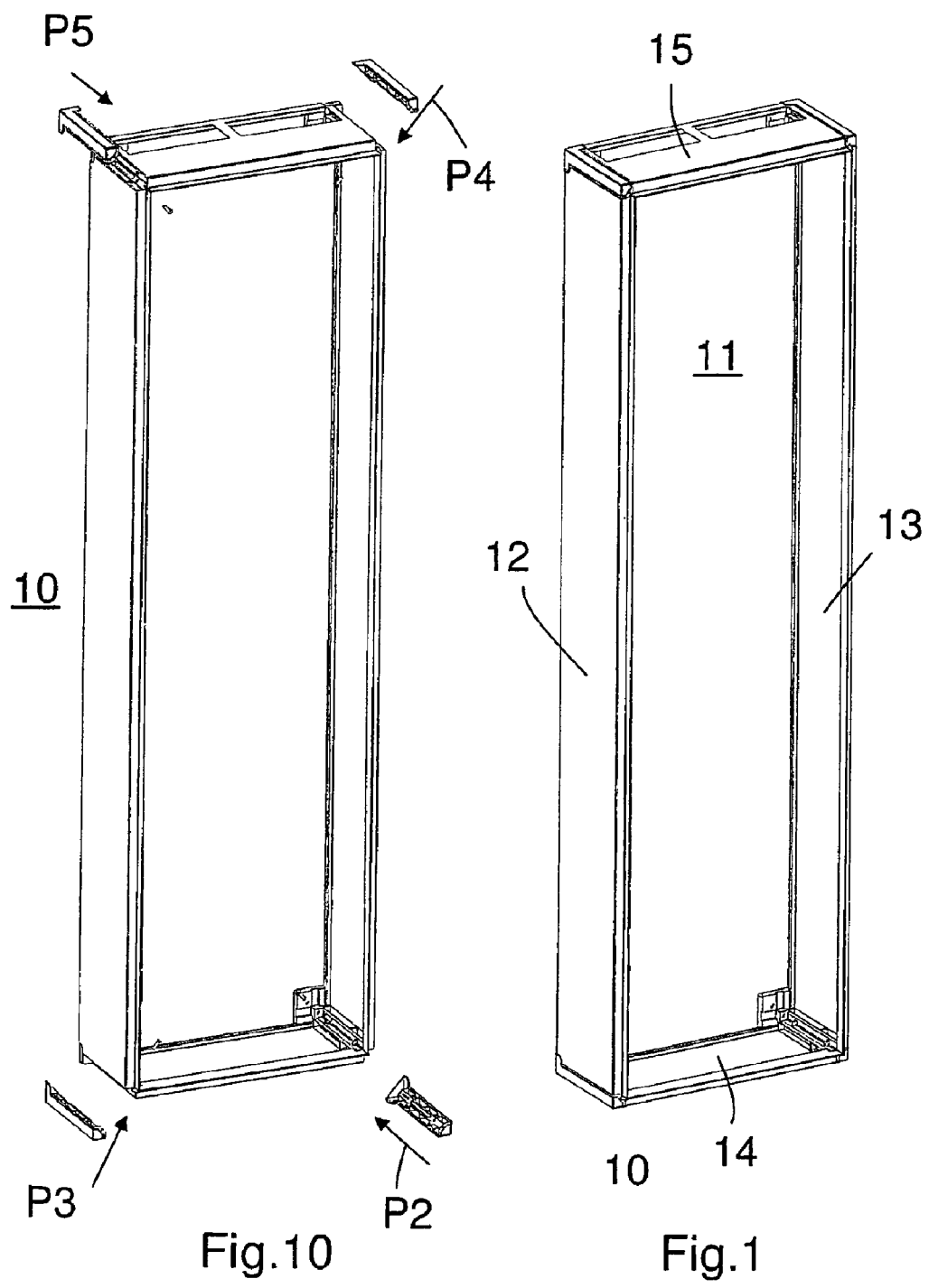

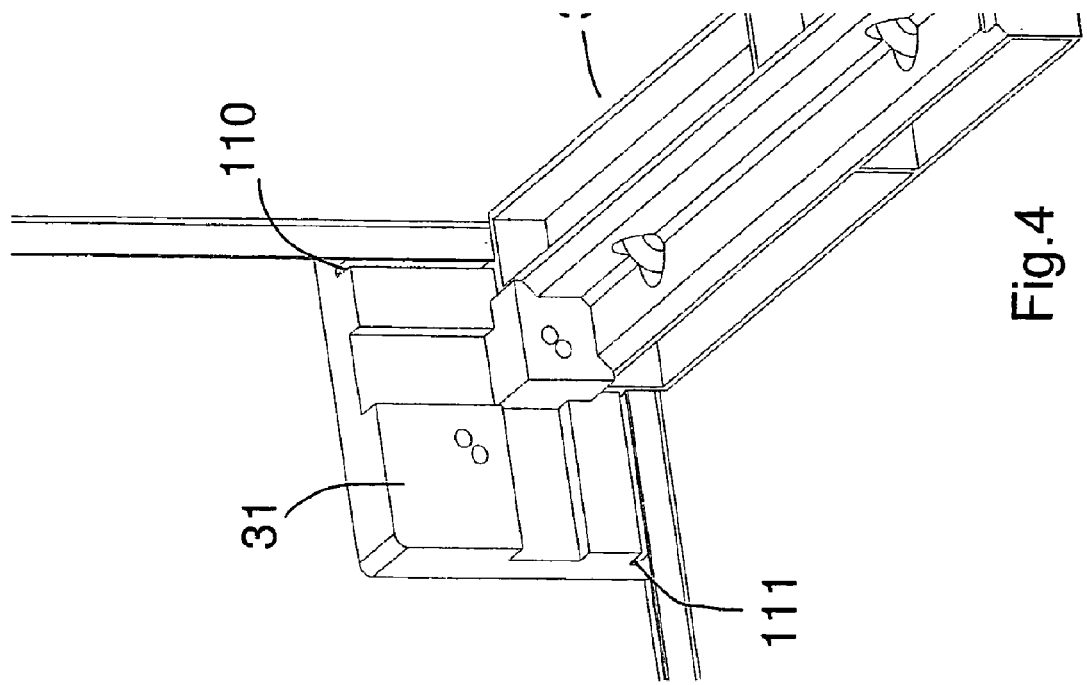
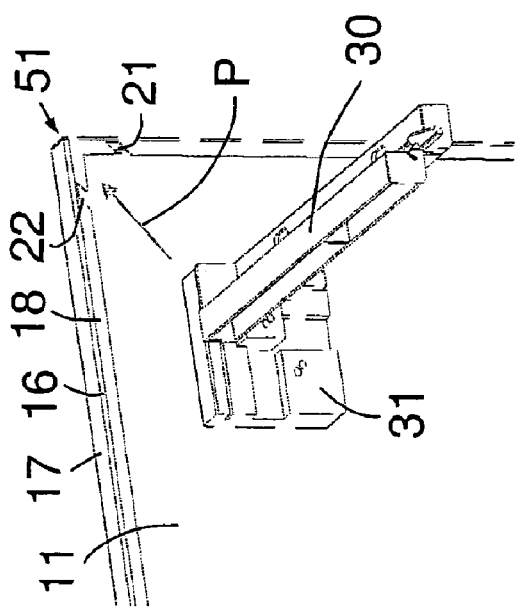
Fig.4
Fig.2

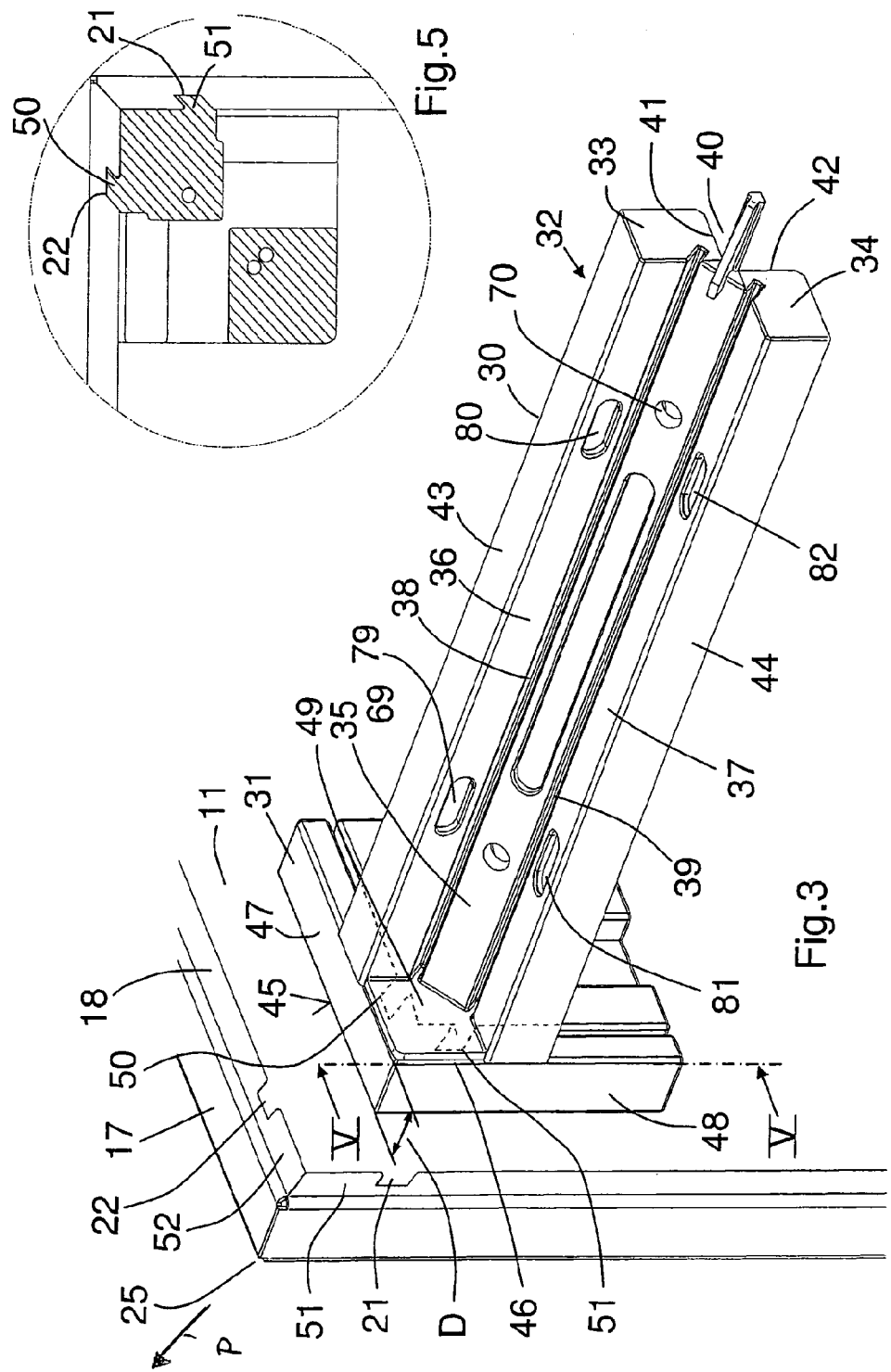

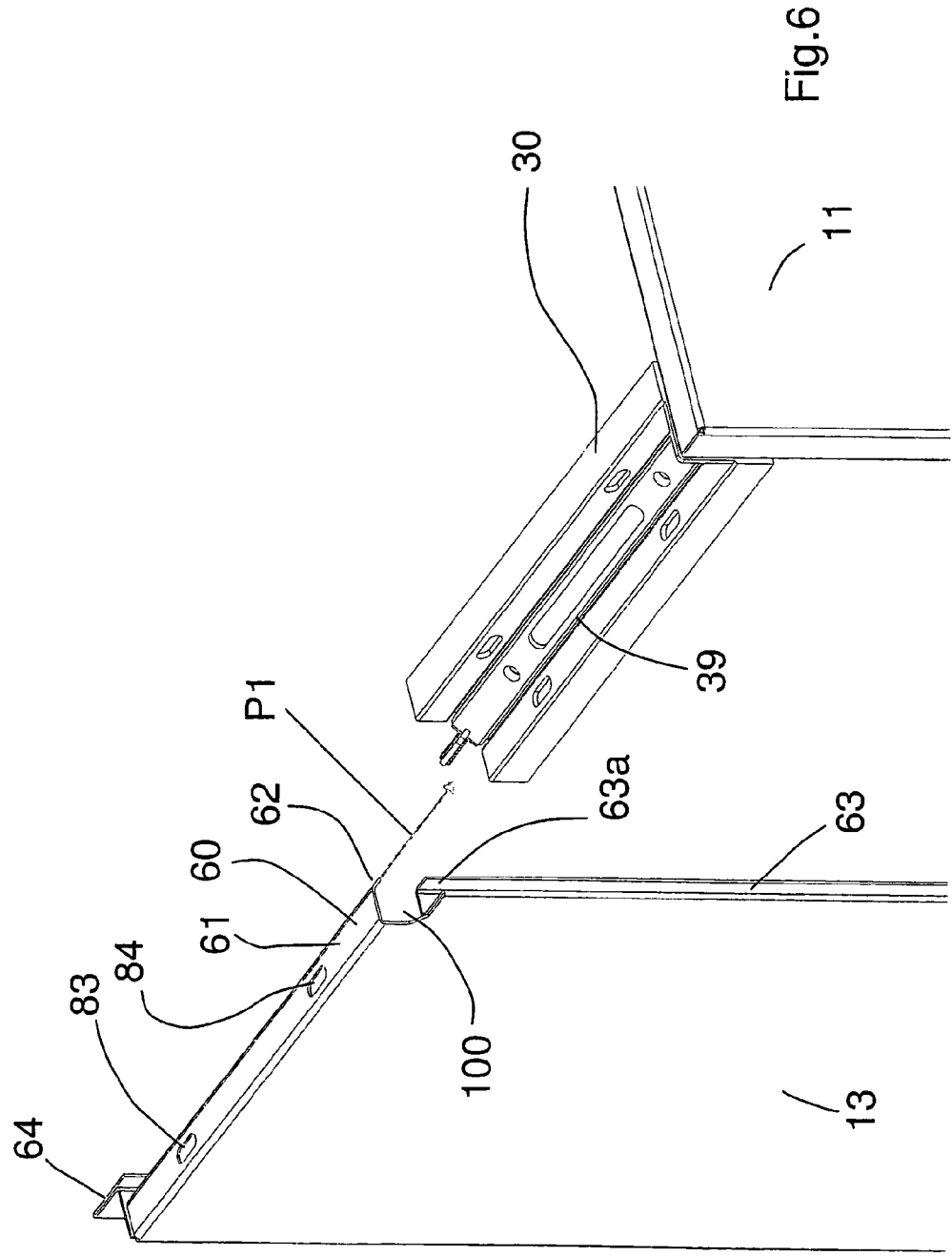

ELECTRICAL SWITCHGEAR CABINET

This is a U.S. National Phase Application under 35 U.S.C. §171 of International Application No. PCT/EP2008/005963 filed on Jul. 21, 2008, which claims priority to German Application No. DE 10 2007 034 513.7, filed on Jul. 24, 2007. The International Application was published in German on Jan. 29, 2009 as WO 2009/012962 under PCT The invention relates to an electrical switchgear cabinet for an electrical service distribution panel.

BACKGROUND

Switchgear cabinets for electrical service distribution panels of this type have a rear wall, two side walls, a base wall and a ceiling wall, and these walls are welded to one another at their edges. A door is fitted in an articulated manner to one of the vertical free edges of the switchgear cabinet which faces forward and the interior of the switchgear cabinet is accessible or can be closed by said door.

The disadvantage of this structural solution is that the switchgear cabinet itself cannot be dismantled but has to be produced in the factory, this being unfavorable in terms of transportation.

SUMMARY OF THE INVENTION

An aspect of the present invention is to provide an electrical switchgear cabinet of the type mentioned in the introduction which can be dismantled for transportation purposes and furthermore can be easily assembled.

According to the invention, the rear wall therefore has a peripheral L-shaped bent edge and also an attachment part for the side walls, the base wall and the ceiling wall, it being possible for the attachment part to be inserted behind the bent edges in the region of the corners by way of projections; the side walls, the base wall and the ceiling wall are then inserted into longitudinally running slots on the attachment part by way of bent wall edges.

In a preferred embodiment, the bent wall edges on the base wall and ceiling wall and also on the side walls are provided in an approximately L-shaped manner with a bent edge bar which runs at right angles to the wall face, and a bent edge limb which adjoins said bent edge bar, it being possible for the latter to be inserted into in each case one longitudinal slot on the attachment part.

According to one advantageous refinement of the invention, in order to improve mounting the bent edge limb of the bent wall edge is bent in the direction of the inner face, starting from the bent edge bar, at a specific angle. This angle is preferably 45°. The bent edge bar forms an angle of 45° with the inner face of the associated side walls, the base and ceiling wall.

The orientation of the slots in the attachment part is matched to this angle, and therefore the slots in the attachment part run parallel to one another and are likewise oriented at this angle in relation to the side edge of the rear wall. When the specific angle is 45°, the slots likewise run at an angle of 45° in relation to said side edge.

The angle of approximately 45° or perhaps also exactly 45° has the advantage of optimum production options.

In a particularly advantageous refinement, a retaining plate, also called a retaining foot, is integrally formed on the rear wall-side end of the attachment part in order to improve mounting, it being possible for said retaining plate to be inserted parallel to the rear wall face, so as to slide on it, into the respective corner behind the free limbs of the L-shaped first bent edges.

In this case, a receiving gap is advantageously provided in the retaining foot, the limbs of the first bent edges engaging in said receiving gap in the assembled state.

In this case, sawtooth-like pins can be arranged within the receiving gap, said sawtooth-like pins engaging in cutouts in the limbs of the first bent edges in the assembled state.

In this case, the pins run parallel to the insertion direction of the retaining foot onto the associated corner.

Further receiving slots can be integrally formed on the retaining or attachment foot, it being possible for further bent edges on the side walls, on the ceiling wall and on the base wall to be inserted into or engage in said receiving slots.

The attachment part advantageously has an attachment section which is integrally formed on the retaining foot.

This attachment part can preferably have an L shape; outer faces of the limbs of the attachment section which are oriented outward in relation to the switchgear cabinet form a receiving space together with a bar which runs obliquely to said limb faces, with the slots being arranged at the transition point between the outer faces and the bar.

In this case, the receiving gap is located in the region of the receiving space between the limb faces (also called outer faces) and the bar face.

Elongate holes, of which the function is discussed in detail further below, are provided at a suitable distance from one another in these outer faces.

An outer corner part can be placed in the receiving space between the limb face or outer faces and the bar or the bar face, said outer corner part being screwed from the interior of the switchgear cabinet to the attachment part for the purpose of improved mounting.

In this case, the outer corner part can preferably have an approximately rectangular cross section, with a fitting face being provided between two corner part planes which run at right angles to one another, said fitting face corresponding to the bar face of the bar, and therefore the planes and the fitting face in each case running parallel to the limb faces and to the bar face on the attachment part when the outer corner part is mounted.

Projections are integrally formed on the attachment planes of the outer corner part, said projections fitting into the corresponding slots in the outer faces or limb faces of the attachment part in the assembled state.

Furthermore, slots which correspond to the slots are provided on the bent edge bars of the side walls, the base and ceiling wall, and the projections pass through the slots in the second bent edges and the slots in the attachment part for fixing the walls when the outer corner part is mounted in order to brace the side walls, the ceiling and the base wall to the attachment part.

In order for the switchgear cabinet to meet the requirements of standard IP54, the outer corner part in each case has sealing lips comprising soft-elastic material, which sealing lips are placed against the side walls.

Further advantageous refinements of the invention and further advantageous improvements can be found in the further dependent claims.

The invention will be explained and described in greater detail with reference to the drawings which illustrate a switchgear cabinet in different mounting steps.

BRIEF DESCRIPTION OF THE DRAWINGS

In the drawings:

FIG. 1 shows an internal view of a completely assembled switchgear cabinet according to the invention, FIGS. 2, 3 and 4 show different mounting steps for mounting an attachment part on the rear wall, FIG. 5 shows a sectional view according to section line V-V of FIG. 3, with the attachment part mounted, FIG. 6 shows a plan view of the corner region of a switchgear cabinet in a further mounting step, as seen from the rear of the rear wall, FIG. 10 shows the completely assembled switchgear cabinet.

DETAILED DESCRIPTION

Figure 8:
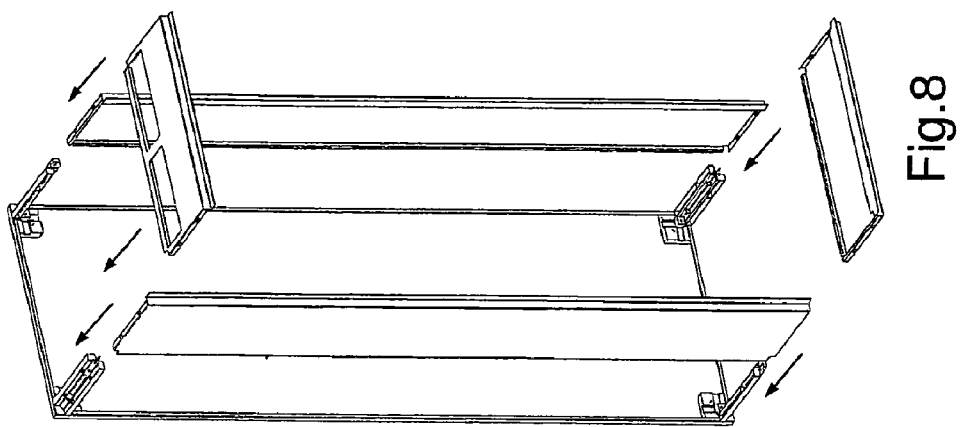
FIG. 8 shows a further mounting step.

Reference will now be made to FIG. 1.

FIG. 1 shows an internal view of a switchgear cabinet 10 which has a rear wall 11, two side walls 12 and 13, a base wall 14 and a ceiling wall 15. Internal components and the front door are not shown.

Reference will now be made to FIG. 2

FIG. 2 shows a perspective view of the right-hand region of the inner side of the rear wall 11 which has peripheral, inwardly projecting bent edges 16 which have a bar 17 which runs at right angles to the rear wall and a limb 18 which runs at right angles to said bar, with the limb 18 running parallel to the inner face of the rear wall 11.

In the region of the corners, of which only the top right-hand corner 19 and the bottom right-hand corner 20 are illustrated, obliquely running cutouts 21, 22 or 23 and 24, also called slots, are located in the limbs 18, said cutouts forming an angle of 45° in relation to the adjacent vertical or horizontal side edge of the rear wall 11, with the open side of the angle of 45° being open to the adjacent corner 19 or 20.

Reference will now be made to FIG. 3.

In contrast to the view of FIG. 2, FIG. 3 illustrates a perspective view of the top left-hand corner 25 of the switchgear cabinet, with the individual elements being provided with the same reference numerals for the purpose of illustrating identity.

In accordance with the number of corners 19, 20, 25, four attachment parts 30 are provided on the rear wall 11, said attachment parts having an attachment foot or an attachment or retaining plate 31 by way of which the attachment part 30 can be inserted into the respective corner 19 or 20 or 25 in accordance with arrow direction P (also see FIG. 2).

The attachment part 30 has a first attachment section 32 which has an approximately L-shaped cross section with two limbs 33 and 34, with the two limbs 33 and 34 being connected by means of an intermediate bar 35 and these together forming the attachment section 32. On the inside, the limbs 33 and 34 each have a limb face 36 and 37 which run at right angles to one another; slots 38 and 39 which run in the longitudinal direction and are arranged parallel to one another and at right angles to the bar 35 are provided between the bar 35, which forms an angle of 45° in relation to the limb faces 36 and 37, and the respective limb faces 36, 37, with the function of said slots being explained in greater detail further below. A cutout 40 is located on the outer side between the two limbs 33 and 34, with the side walls 41 and 42 of the cutout 40 running at right angles to the limb face 36 or 37.

The attachment section 32 is integrally connected to the retaining plate 31, also called retaining foot, with the retaining foot 31 running at right angles to the longitudinal extent of the limbs 33 and 34 or at right angles to the longitudinal extent of the attachment section 32.

In this case, the attachment section 32 is integrally formed in an asymmetrical manner on the retaining foot 31, and therefore the outer faces 43 and 44 which run at right angles to the limb faces 36 and 37 lie level with the outer face of the bars 17 in the assembled state and are located approximately in the plane of the narrow side faces 47 and 48. The retaining foot 31 is approximately square and the attachment section 32 is mounted in the region of one of the corners of the retaining foot 31. The space 49 located between the limb faces 36, 37 and the bar face 35 is open to the corners, which together form the two narrow side walls 47, 48, and adjoins these corners.

The retaining foot 31 has a receiving gap 46 at a distance from the outer face (not visible in FIG. 3) which protrudes from the inner face of the rear wall in the assembled state, said receiving gap being provided in the region of the narrow side faces 47 and 48 of the retaining foot 31 within the space 49 which is located through the limb faces 36, 37 and the bar 35. The receiving gap 46 is therefore located outside the attachment section 32 in relation to the interior of the switchgear cabinet, and the limbs 18 lie on the retaining foot within the attachment section, in relation to the switchgear cabinet.

FIG. 5 shows a section through the receiving gap 46 according to section line VI-VI and sawtooth-like pins 50 and 51 can be seen within the receiving gap 46, said sawtooth-like pins being dimensioned such that they can engage in the cutouts 21, 22 and 23, 24 respectively.

Accordingly, the attachment part 30 is placed on the inner face of the rear wall 11 by way of the outer face 45 of the attachment foot 31 and then pushed into the respective corner in arrow direction P, and therefore the sections 52, 52a of the limbs 18 which are located between the cutouts 21 and 22 and the associated corner 25 engage in the receiving gap 46, and the sawtooth-like projections or pins which are present within the receiving gap 46 engage in the cutouts 21 and 22. In FIG. 3, the inner contour of the receiving gap 46 with the sawtooth-like projections 50 and 51 is illustrated in dashed lines. The thickness of the attachment foot 31, in relation to the switchgear cabinet, within the attachment section 32 corresponds to the thickness D, that is to say to the distance between the inner face of the rear wall 11 and the inner face of the limb 18.

FIG. 4 shows the attachment part 30 in the finally installed state when, therefore, the retaining foot or attachment foot 31 is tucked behind the limbs 18 of the peripheral bent edge 16. Within the free edge of the limbs 18 and within the attachment section 31, the retaining foot 31 in each case has a receiving slot 110, 111 which is parallel to the adjacent edge of the limbs 18, see further below. FIG. 4 shows the attachment part 30 in the region of the bottom right-hand corner of the switchgear cabinet. All the attachment parts 30 are identical and are only rotated in each case through 90° in relation to the adjacent attachment part 30 in accordance with the mounting position, as can be seen in FIG. 2, FIG. 3, FIG. 4 and also FIG. 8.

Reference will now be made to FIG. 6.

In said FIG. 6, the rear wall 11 is perspectively illustrated from the rear, with the attachment part 30 being fixed to the rear wall 11.

The side wall 13 should now be mounted, this being performed as follows:

at its upper and lower horizontally running edge, the side wall 13 has an L-shaped bent edge 60 which has a bent edge bar 61 which runs at right angles to the side wall 13 and a bent edge limb 62 which is bent through an angle of 45° in relation to said bent edge bar, with the angle between the bent edge bar 61 and the bent edge limb 62 on the inner side of the bent edge 60 being 135°.

Further bent edges 63 and 64 are provided on the vertically running side edges of the side wall 13. The bent edges 63 have a limb 63a which engages in the respective receiving slot 110, 111.

In order to mount the side wall 13, the side wall is inserted into the slot 39 in accordance with arrow direction P1 from the free end side of the attachment part 30 by way of the limb 62, specifically in the direction of the longitudinal extent of the attachment part 30.

Figure 7:
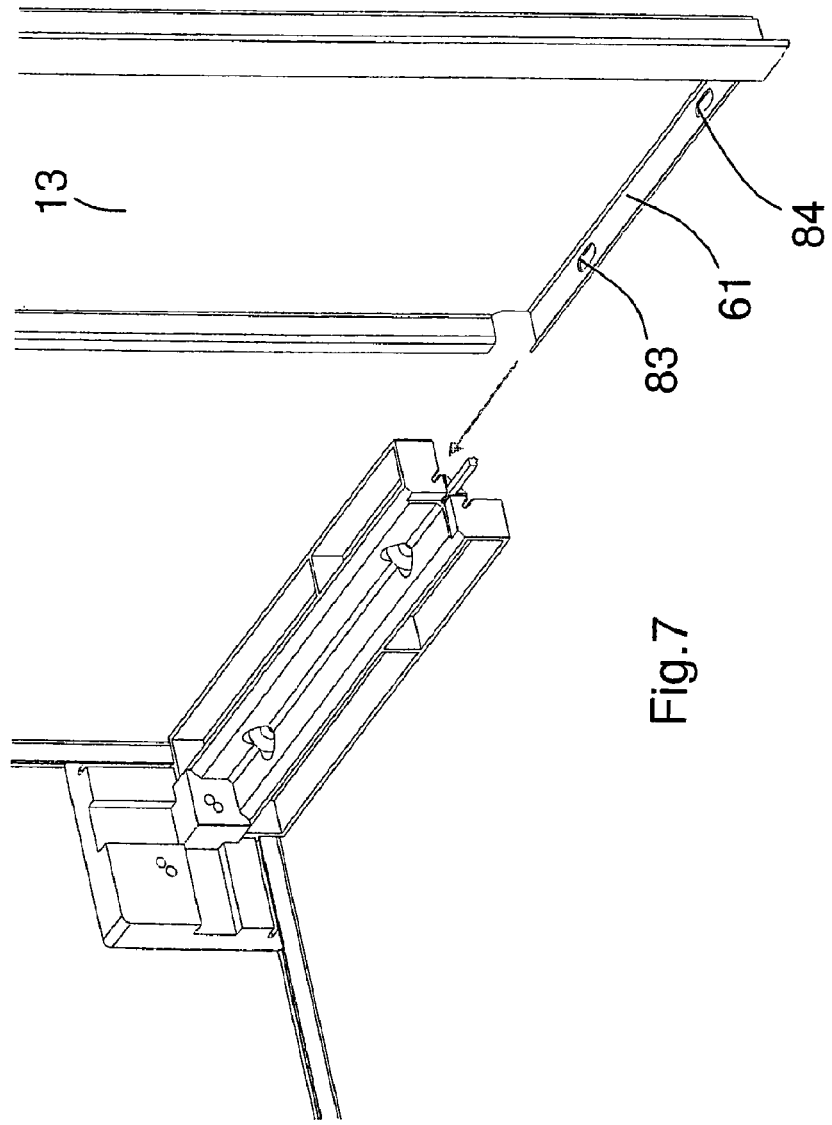
FIG. 7 shows a view which is similar to that of FIG. 6 of an attachment part before insertion of a side wall.

FIG. 7 shows the same mounting step for the side wall 13 at its lower edge, this also being applicable for the other side wall 12.

The base and ceiling walls 14, 15 are also inserted into the other longitudinally running slots in the attachment part 30 in a corresponding manner, and therefore the cabinet is substantially completely assembled after the mounting step shown in FIG. 8.

Figure 9:
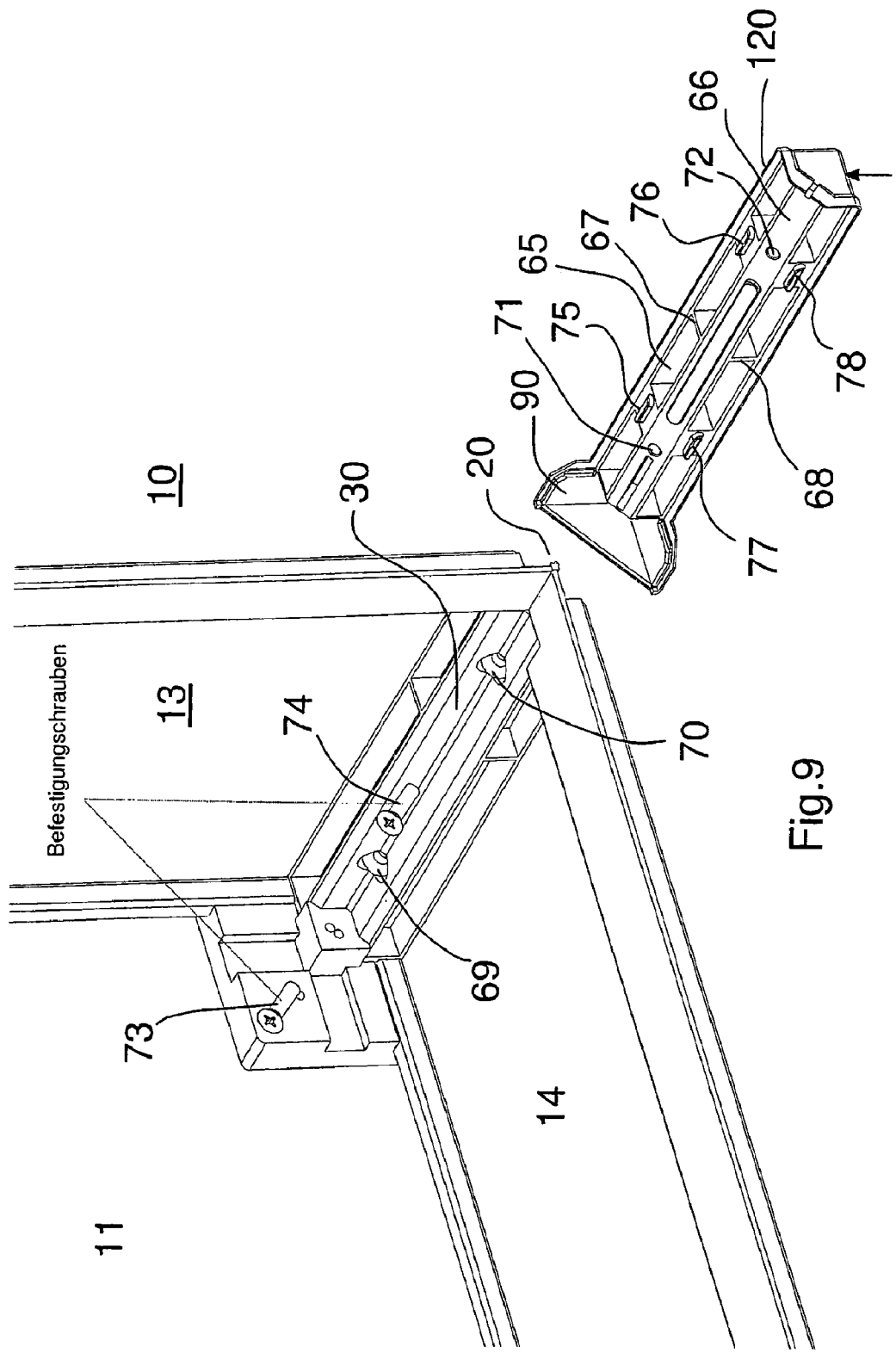
FIG. 9 shows a view into a switchgear cabinet in the region of the bottom-right corner after mounting of the base and side wall and before the outer corner part is positioned.

Reference is now made to FIG. 9.

FIG. 9 shows the attachment part 30 which is completely mounted in the corner 20 of the switchgear cabinet 10. FIG. 9 shows an internal view of the interior of the switchgear cabinet 10 with the rear wall 11, the side wall 13 and the base wall 14. An outer corner part 65 which has a substantially square shape can be placed on the outer side, that is to say in the space 49, of the attachment part 30, with one corner of this square cross-sectional shape being slanted, and therefore forming a fitting face 66 which, together with the bar planes 67 and 68 which adjoin said fitting face on both sides, forming the shape which can be inserted into the space 49 between the faces 36, 37 and the bar face 35. The fitting face 66 runs parallel to the bar face 35 in the assembled state.

The bar face 35 or the bar 35 has two bores 69 and 70, with the threaded bores 71 and 72 in the outer corner part corresponding to said bores. Attachment screws 73 and 74 are passed through the bores 69 and 70 from the inside, and therefore the outer corner part 65 is screwed to the attachment part 30. In the region of the planes 67 and 68, the outer corner part has strip-like projections 75 and 76 or 77 and 78 which can be inserted into corresponding elongate holes 79 and 80 or 81 and 82 in the attachment part in the region of the faces 36, 37. Elongate holes 83 and 84 in the bars 61 correspond to the elongate holes 79, 80, 81 and 82, and the projections 75 to 78 can then pass or engage through said elongate holes 83 and 84 in order to secure the side wall or the other walls. Displacement of the side walls or the base and ceiling wall in the direction of the longitudinal extent of the attachment parts 30 is also prevented as a result.

FIG. 10 shows the switchgear cabinet 10 before the final completion, specifically in such a way that the outer corner parts 65 are not yet mounted but hover in front of their final attachment position in the manner of an exploded illustration. The final fixing is performed by the outer corner parts being placed on the inner corner parts or attachment parts at right angles in arrow directions P2, P3, P4 and P5, and then being firmly screwed in this position. This produces the switchgear cabinet according to FIG. 1.

A type of covering cap 90 is integrally formed on the rear wall-side end of the outer corner parts 65, said covering cap engaging over a rear region of the side walls, the base and the ceiling wall, as can be seen in FIG. 1; to this end, in each case a cutout 100 is provided in the rear corners of the side walls, the base and ceiling wall, with the covering cap 90 engaging in said cutout and therefore producing a visually appealing covering.

Peripheral sealing lips 120 are provided on the outer corner part, said sealing lips of being placed against the outer faces on the switchgear cabinet in the region of the outer corner part 65 and thus providing protection with an IP54 rating.

LIST OF REFERENCE SYMBOLS

10 Protective cabinet
11 Rear wall
12 Side wall
13 Side wall
14 Base wall
15 Ceiling wall
16 First bent edge
17 Bar
18 Limb
19 Corner
20 Corner
21 Cutout
22 Cutout
23 Cutout
24 Cutout
25 Corner
30 Attachment part
31 Retaining plate, attachment plate
32 Attachment section
33 Limb
34 Limb
35 Intermediate bar
36 Limb face
37 Limb face
38 Slot
39 Slot
40 Cutout
41 Side walls of cutout 40
42 Side wall of cutout 40
43 Outer face
44 Outer face
45 Outer face
46 Receiving gap
47 Narrow side face
48 Narrow side face
49 Space
50 Pin
51 Pin
52 Section
52a Section
60 Bent edge
61 Bent edge bar
62 Bent edge limb
63 Bent edges
64 Bent edges
65 Outer corner part
66 Fitting face
67 Bar plane
68 Bar plane
69 Bore
70 Bore
71 Threaded bores
72 Threaded bores
73 Attachment screw
74 Attachment screw
75 Projection 76 Projection
77 Projection
78 Projection
79 Slot
80 Slot
81 Slot
82 Slot
83 Slot
84 Slot
90 Covering cap
100 Cutout
110 Receiving slot
111 Receiving slot

The invention claimed is:

1. An electrical switchgear cabinet for an electrical service distribution panel comprising:
a rear wall having four side edges forming four corners and a peripheral L-shaped first bent edge disposed on each of the four side edges;
a first side wall with at least two bent edges;
a base wall with at least two bent edges; and
a first attachment part disposed at a first corner of the rear wall and insertable behind the L-shaped first bent edges of the' first corner, wherein the first attachment part has two longitudinally running slots, a first slot receiving one of the at least two bent edges of the first side wall and a second slot receiving one of the at least two bent edges of the base wall.

2. The electrical switchgear cabinet as recited in claim 1, further comprising:
a second side wall with at least two bent edges; and
a second attachment part disposed at a second corner of the rear wall and insertable behind the L-shaped first bent edges of the second corner, wherein the second attachment part has two longitudinally running slots, a first slot receiving one of the at least two bent edges of the base wall and a second slot receiving one of the at least two bent edges of the second side wall.

3. The electrical switchgear cabinet as recited in claim 2, further comprising:
a ceiling wall with at least two bent edges; and
a third attachment part disposed at a third corner of the rear wall and insertable behind the L-shaped first bent edges of the third corner, wherein the third attachment part has two longitudinally running slots, a first slot receiving one of the at least two bent edges of the ceiling wall and a second slot receiving one of the at least two bent edges of the first side wall.

4. The electrical switchgear cabinet as recited in claim 3, further comprising:
a fourth attachment part disposed at a fourth corner of the rear wall and insertable behind the L-shaped first bent edges of the fourth corner, wherein the fourth attachment part has two longitudinally running slots, a first slot receiving one of the at least two bent edges of the ceiling wall and a second slot receiving one of the at least two bent edges of the second side wall.

5. The electrical switchgear cabinet as recited in claim 1, wherein each of the at least two bent wall edges of the first side wall is formed in an L-shaped manner, with a bent edge bar of the first side wall being disposed at a right angle to a first side wall face and having a bent edge limb of the first side wall adjoining the bent edge bar of the first side wall, wherein the bent edge limb of the first side wall is insertable into the first slot, and wherein each of the at least two bent wall edges of the base wall is formed in an L-shaped manner, with a bent edge bar of the base wall being disposed at a right angle to a base wall face and having a bent edge limb bar of the base wall adjoining the bent edge bar of the base wall, wherein the bent edge limb bar of the base wall is insertable into the second slot.

6. The electrical switchgear cabinet as recited in claim 5, wherein each of the bent edge limbs is bent inward from each of the bent edge bars at an angle disposed between an inner face of a respective one of the bent edge limbs and one of the first side and base walls.

7. The electrical switchgear cabinet as recited in claim 6, wherein the two longitudinally running slots are parallel to one another and are disposed at an angle in relation to one of the four side edges of the rear wall, and wherein the bent edge limb of the first side wall fits into the first slot, and wherein the bent edge limb of the base wall fits into the second slot.

8. The electrical switchgear cabinet as recited in claim 1, wherein the first attachment part includes a retaining foot disposed on a rear wall-side end of the first attachment part, wherein the retaining foot is insertable parallel to a rear wall inner face so as to slide on the rear wall inner face into the first corner behind a first free limb of a first one of the four side edges and a second free limb of a second one of the four side edges.

9. The electrical switchgear cabinet as recited in claim 8, wherein a receiving gap is disposed in the retaining foot, and wherein the first and the second free limb engage in the receiving gap in an assembled state.

10. The electrical switchgear cabinet as recited in claim 9, further comprising at least one sawtooth-like pin disposed in the receiving gap and engaging a first cutout of the first free limb and a second cutout of the second free limb in an assembled stated.

11. The electrical switchgear cabinet as recited in claim 10, wherein the at least one sawtooth-like pin runs parallel to an insertion direction of the retaining foot into the first corner.

12. The electrical switchgear cabinet as recited in claim 9, wherein the first attachment part includes an attachment section integrally formed on the retaining foot.

13. The electrical switchgear cabinet as recited in claim 12, wherein the attachment section has an approximate L-shape with a first attachment limb having a first limb face and a second attachment limb having a second limb face, each limb face oriented outward in relation to the switchgear cabinet, wherein the first and second limb faces form a receiving space with an oblique bar running obliquely to the limb faces, and wherein the first slot is disposed at a transition point between the first limb face and the oblique bar, and wherein the second slot is disposed at a transition point between the second limb face and the oblique bar.

14. The electrical switchgear cabinet as recited in claim 13, wherein the receiving gap is disposed in a region of the receiving space.

15. The electrical switchgear cabinet as recited in claim 13, wherein at least one elongate hole is disposed on each of the first and second limb faces.

16. The electrical switchgear cabinet as recited in claim 13, further comprising an outer corner part insertable from outside in relation to the switchgear cabinet into the receiving space and corresponding and attachable to the attachment section.

17. The electrical switchgear cabinet as recited in claim 16, wherein the outer corner part includes an approximately rectangular cross section and a fitting face disposed between a first and a second corner part plane running at right angles to one another, and wherein the fitting face corresponds to the bar face such that the first corner part plane is parallel to the first limb face, the second corner part plane is parallel to the second limb face, and the fitting face is parallel to the bar face in the assembled state.

18. The switchgear cabinet as recited in claim 17, wherein at least one first projection is integrally formed on the first corner part plane, the at least one first projection corresponding to the at least one elongate hole of the first limb face in the assembled state, and wherein at least one second projection is integrally formed on the second corner part plane, the at least one second projection corresponding to the at least one elongate hole of the second limb face in the assembled state.

19. The switchgear cabinet as recited in claim 18, wherein at least one further elongate hole disposed on a bent edge bar of the first side wall corresponds to the at least one elongate hole of the first limb face, and wherein at least one further elongate hole disposed on a bent edge bar of the base wall corresponds to the at least one elongate hole of the second limb face, and wherein the at least one first projection of the first corner part plane passes through the at least one further elongate hole of the first side wall and the at least one elongate hole of the first limb face when the outer corner part is mounted so as to brace the first wall to the first attachment part, and wherein the at least one second projection of the second corner part plane passes through the at least one further elongate hole of the base side wall and the at least one elongate hole of the second limb face when the outer corner part is mounted so as to brace the base wall to the first attachment part.

20. The electrical switchgear cabinet as recited in claim 19, wherein the outer corner part can be fixed to the attachment section by attachment screws screwed from inside and through the attachment section into the outer corner part.

21. The electrical switchgear cabinet as recited in claim 20, wherein the corner part includes peripheral sealing lips comprising soft-elastic material and configured to rest in a sealing manner against an outer face of the first wall and the base wall.

22. The electrical switchgear cabinet as recited in claim 8, wherein two further receiving slots are formed on the retaining foot, and wherein a first one of the two further receiving slots receives a further bent edge of the first side wall and a second one of the two further receiving slots receives a further bent edge of the base wall.

* * * * *